United States Patent Office 3,499,777
Patented Mar. 10, 1970

3,499,777
PROCESS FOR PRODUCING SUBSTANTIALLY PURE DEAD BURNED MAGNESIA WITH HIGH DENSITY AND LOW POROSITY HAVING DECREASED EFFECTIVE CRYSTAL SURFACES FOR REFRACTORY OR CERAMIC PURPOSES
Alfred P. Dreyling and Lewis J. Dreyling, East Brunswick, N.J., assignors to Quigley Company, Inc., a corporation of New York
No Drawing. Continuation of application Ser. No. 578,170, Sept. 9, 1966, which is a continuation-in part of application Ser. No. 395,287, Sept. 9, 1964. This application Oct. 24, 1968, Ser. No. 770,401
Int. Cl. C04b 35/04
U.S. Cl. 106—60      2 Claims

ABSTRACT OF THE DISCLOSURE

This process comprises the step of thoroughly mixing in fine grain form magnesia-yielding material with three inorganic compounds in fine grain form and of the character to produce boron, iron oxide and phosphoric oxide during calcining and to produce in the end magnesia product after calcining magnesium ferrites, magnesium ortho borates and magnesium ortho phosphates.

---

This application is a continuation of our copending application Ser. No. 578,170, filed Sept. 9, 1966, and now abandoned, which in turn was a continuation-in-part of our application Ser. No. 395,287, filed Sept. 9, 1964 copending therewith but now abandoned.

This invention is directed to the production from seawater or natural magnesia of substantially pure dead burned magnesia with high density and low porosity and having a very tightly interlocked crystalline structure.

When magnesia is to be used for ceramic or refractory purposes the presence of impurities as well as the existence of a crystalline structure having large loosely interlinked crystals and or porosity will markedly reduce the overall refractoriness of the material, and what is even worse the loose crystalline structure will markedly lower its ability to bear loads at high temperatures and lower its resistance to thermal spalling and corrosion by acidic materials.

Magnesia (magnesium oxide) in relatively high purity state has been very difficult to prepare in small crystalline form and high densities due to the necessity of firing or heating to temperatures above 2000° C. (3600° F.). Since such temperatures are very difficult to obtain, it has been the common practice to fuse the magnesia in an electric furnace where purities better than about 95% (MgO) are required. Fusion in the electric furnace unfortunately yields a product which is relatively inert and is totally unsatisfactory for some purposes, especially where it is necessary to bond the magnesia to form suitable high temperature resisting ceramic and refractory products.

In the past, it has been the practice to employ additions in the form of impurities such as silica, lime, alumina, etc., along with the magnesia in order to flux the mixture and thus allow burning and resulting crystallization to take place at lower temperatures depending on the kind of additives employed and the amounts thereof. The net result has been to produce magnesia with large amounts of impurities and as stated above this material is not fit for use in high temperature ceramics or refractories.

An object of this invention is to provide a process for forming magnesia (MgO) of a purity better than 85% MgO and having a suitably grained crystalline structure which will result in high density and low porosity with a decreased effective crystal surface.

It is also an object of the invention to produce a well crystallized magnesia with high purity without having recourse to materials which will appreciably reduce the refractoriness of the magnesia and therefore allow it to be used in the preparation of ceramic and refractory products for certain purposes, such as in steel making.

Another object of the invention is to provide a process for the production of well crystallized magnesia having high purity at temperatures easily obtainable in kilns which are fuel fired at high production rates.

A further object of the invention is to provide a process for the production of well crystallized dense magnesia from ordinary magnesia-yielding materials wherein the temperatures employed and the burning or calcining time allow the material to be produced in a much shorter time than has been possible heretofore.

It has now been found that the crystallization of magnesia can be very closely controlled to allow the formation of magnesia or periclase having high densities and low porosities with decreased effective crystal surfaces which will increase the hydration resistance from materials which normally form or yield magnesia or periclase upon firing or calcining by adding to the materials from 3.2% to 15% of inorganic compounds which contain boron, iron and phosphorous in quantities sufficient to produce from 0.2% to 5% by weight of boron oxide and from 2% to 5% by weight of iron oxide and from 1% to 5% by weight of phosphoric oxide in the mixture during firing or calcining. The boron compounds are used primarily for hydration control in the mixture while the iron compounds and phosphorous compounds are used for porosity and crystal formation control. In addition, the inorganic compounds are such that they will, under the normal temperatures of calcining, combine with the magnesia to form magnesia borates, magnesium ferrites and magnesium phosphates which are not deleterious to the refractoriness of the end products but which in their reaction with the magnesia cause the formation of a tighter crystalline structure.

The magnesia-yielding material that is to be used in the practice of the invention should be a magnesium compound which will form or yield magnesia (magnesia oxide) upon firing. Such material must be finely divided and includes magnesium hydroxide, magnesium carbonate, etc. Preferably, the magnesium compound starting material should be treated to produce a grain size to pass through a 100 mesh screen; a further improved operation may be obtained when the starting material passes through a 325 mesh screen. The inorganic compounds that are added in ratios of from 3.2% to 15% to the from 85% to 96.8% by weight of magnesium compound may be in the form of oxides of boron, iron and phosphorous or may be in combined form with total weights computed on the basis of the oxides per se. The oxides in their preferred form are boron oxide ($B_2O_3$), ferric oxide ($Fe_2O_3$) and phosphoric oxide ($P_2O_5$) in the following amounts: 0.2% to 5% of boron oxide by weight, 2% to 5% of ferric oxide by weight and 1% to 5% of phosphoric oxide by weight. Numerous other compounds can be used such as magnesium ortho borate, ferrous phosphate, ferric phosphate, magnesium pyro phosphate, magnesium ferrite, all of which will upon firing and calcining produce the above mentioned oxides which will react with the magnesium compound to control the hydration and crystallization of the magnesia and result in a high density and low porosity with a tight crystalline structure and having decreased effective crystal surfaces which will increase the hydration resistance. The inorganic compounds chosen are also treated to produce a grain size which will pass through a 100 mesh screen; improved results may be obtained when the compounds are so sized as to pass through a 325 mesh screen.

The magnesia-yielding material is thoroughly and intimately mixed with the inorganic material and the resultant mixture is then pelletized and made ready for calcining or firing. The pellets are calcined at dead burning temperatures at or above 2750° F., according to the purity desired, to cause the formation of magnesium ferrites, magnesium ortho borates and magnesium ortho phosphates, all of which are directly formed in the magnesia end product.

The boron compounds by their addition to the mixture actually reduced the porosity and increase the hydration resistance of the end product magnesia. The iron compounds are added as a fluxing agent and promote the reaction of the boron and phosphate compounds during firing. In addition, the magnesium ferrites which are formed during the dead burning are further useful when the end product magnesia is utilized to form refractory or ceramic products, the iron oxide acting as a fluxing agent. The phosphate compounds are also added to assist in the densification of the resultant product magnesia.

It is an advantage of the instant process that a mixture of the materials described herein may be fired to crystallization equilibrium at temperatures as low as 2750° F. in a continuous process in a rotary kiln to produce magnesia of high purity. It is also an advantage that a denser product is obtained having low porosity with decreased effective crystal surfaces. In addition, smaller crystals are obtained by the addition of the inorganic compounds herein described than when the same magnesium compound is fired alone. The temperature of calcining or firing used herein also assures that maximum shrinkage will take place and thus produce maximum density. Moreover, the calcium and silicon oxides contained in the magnesium compound used for mixing with the inorganic compounds are kept at a minimum to provide the highest temperature resistant magnesia possible.

As a working example of the invention use magnesium hydroxide as the magnesia-yielding raw material reduced to a size that will pass through a 325 mesh screen and in amount sufficient to provide in the mixture on a weight basis at least 93.3% magnesium oxide equivalent. Add inorganic oxide in the form of oxides per se as follows:

|  | Percent |
|---|---|
| Boron oxide ($B_2O_3$) | 0.2 |
| Iron oxide ($Fe_2O_3$) | 4 |
| Phosphoric oxide ($P_2O_5$) | 2.5 |

All percentages given are by weight of the total mixture to be fired.

The inorganic compounds are also reduced to a size that will pass through a 325 mesh screen and are then thoroughly and intimately mixed with the magnesia hydroxide and formed into pellets and fired or calcined at 3000° F. to result in an end product containing 93.3% MgO. The phosphoric oxide tends to increase the action of the boron oxide and iron oxide and tends to reduce the porosity and increase the denseness at a lower firing temperature than could otherwise be obtained. The normal action of the boron oxide and iron oxide is to reduce porosity and increase hydration resistance. The resulting product will be acceptable for use in the preparation of ceramic and refractory products.

What is claimed is:

1. A process for producing substantially pure dead burned magnesia with high density and low porosity and with decreased effective crystal surfaces and increased hydration resistance for refractory or ceramic purposes, which comprises thoroughly mixing material in fine grain form of the type to yield magnesia when calcined, with three inroganic compounds in fine grain form and of the character to render available for reaction during calcining boron oxide, iron oxide and phosphoric oxide and to produce in the end magnesia product after calcining magnesium ferrites, magnesium ortho borates and magnesium ortho phosphates, the total mixture produced thereby comprising magnesia-yielding material present in sufficient amount to yield a final fired product containing 85% to 96.8% of magnesium oxide and the inorganic compounds being of a character and being sufficient in amount in the mixture to render available during calcining for reaction with said magnesia-yielding material from 0.2% to 5% by weight of boron oxide, from 2% to 5% by weight of iron oxide and from 1% to 5% by weight of phosphoric oxide, forming the mixture into pellets, and calcining the pellets at a dead burning temperature.

2. A process for producing a substantially pure dead burned magnesia product with high density and low porosity and with decreased effective crystal surfaces and increased hydration resistance for refractory or ceramic purposes which comprises preparing a mixture in fine grain form comprising magnesium hydroxide, boron oxide, iron oxide, and phosphoric oxide, in amounts sufficient to give on a weight basis at least 93.3% magnesium oxide equivalent and of the order of 0.2% boron oxide, 4% iron oxide, and 2.5% phosphoric oxide, forming the mixture into pellets and calcining the pellets at a dead burning temperature to produce in the end product after calcining, magnesium ferrites, magnesium ortho borates and magnesium ortho phosphates in addition to the magnesia.

References Cited

UNITED STATES PATENTS

| 2,229,297 | 1/1941 | Lee | 106—60 |
| 2,640,759 | 6/1953 | Hughey | 106—58 |

JAMES E. POER, Primary Examiner